(12) United States Patent
Huang et al.

(10) Patent No.: US 12,346,269 B2
(45) Date of Patent: Jul. 1, 2025

(54) COMPUTING STORAGE SEPARATION SYSTEM AND DATA ACCESS METHOD THEREFOR, MEDIUM, AND ELECTRONIC DEVICE

(71) Applicant: Beijing Bytedance Network Technology Co., Ltd., Beijing (CN)

(72) Inventors: Kaixin Huang, Beijing (CN); Yang Zhang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/283,752

(22) PCT Filed: Apr. 21, 2022

(86) PCT No.: PCT/CN2022/088168
§ 371 (c)(1),
(2) Date: Sep. 22, 2023

(87) PCT Pub. No.: WO2022/252862
PCT Pub. Date: Dec. 8, 2022

(65) Prior Publication Data
US 2024/0152468 A1   May 9, 2024

(30) Foreign Application Priority Data
Jun. 2, 2021   (CN) .......................... 202110615703.5

(51) Int. Cl.
*G06F 12/14*   (2006.01)
*G06F 12/02*   (2006.01)

(52) U.S. Cl.
CPC ...... *G06F 12/1483* (2013.01); *G06F 12/0246* (2013.01)

(58) Field of Classification Search
CPC ............ G06F 12/1483; G06F 12/0246; G06F 2212/1024; G06F 2212/173;
(Continued)

(56) References Cited

U.S. PATENT DOCUMENTS 10,042,768 B1 *  8/2018  Karnowski ........... H04L 67/568
10,372,561 B1 *  8/2019  Wei ..................... G06F 11/1088
(Continued)

FOREIGN PATENT DOCUMENTS

CN   103207894 A   7/2013
CN   107771332 A   3/2018
(Continued)

OTHER PUBLICATIONS

First Office Action and Search Report in CN202110615703.5, mailed Apr. 29, 2023, 13 pages.
(Continued)

*Primary Examiner* — Nanci N Wong
(74) *Attorney, Agent, or Firm* — Astute IP Law Group

(57) ABSTRACT

Provided are a computing storage separation system and a data access method therefor, the method includes: acquiring a data access request; acquiring, based on a type of the data access request, an index table on a master node of the computing storage separation system or synchronization metadata information of the master node and a slave node of the master node; when the data access request is a data read request, querying an index item of a to-be-read data block in the index table, and reading the to-be-read data block based on an index item query result; and/or when the data access request is a data write request, writing a to-be-written data block into an idle space of a persistent memory on the slave node based on the synchronization metadata information.

17 Claims, 10 Drawing Sheets

(58) Field of Classification Search
CPC ......... G06F 2212/214; G06F 2212/264; G06F 12/0888; G06F 2212/154; G06F 2212/263; G06F 3/067; G06F 12/0871; G06F 12/0868; G06F 16/2255; G06F 16/2282; G06F 16/24552

See application file for complete search history.

(56) References Cited

U.S. PATENT DOCUMENTS

| | | | |
|---|---|---|---|
| 2016/0085696 A1* | 3/2016 | Chiu | G06F 3/0647 |
| | | | 711/164 |
| 2017/0242822 A1* | 8/2017 | Malladi | G06F 3/0619 |
| 2019/0281113 A1 | 9/2019 | Preston et al. | |
| 2020/0183836 A1 | 6/2020 | Johns et al. | |
| 2020/0409877 A1 | 12/2020 | Balle et al. | |

FOREIGN PATENT DOCUMENTS

| | | | |
|---|---|---|---|
| CN | 107888657 A | | 4/2018 |
| CN | 110019093 A | | 7/2019 |
| CN | 110109889 A | * | 8/2019 |
| CN | 110149803 A | | 8/2019 |
| CN | 110691062 A | | 1/2020 |
| CN | 111309270 A | | 6/2020 |
| CN | 111400268 A | | 7/2020 |
| CN | 111708719 A | | 9/2020 |
| CN | 113220693 A | | 8/2021 |
| WO | 2020041928 A1 | | 3/2020 |

OTHER PUBLICATIONS

International Search Report in PCT/CN2022/088168, mailed Jul. 5, 2022, 4 pages.

Notice of Decision Granting Patent Right for Invention and Supplementary Search in CN202110615703.5, mailed Sep. 15, 2023, 4 pages.

Youmin et al., "Survey on RDMA-Based Distributed Storage Systems," Journal of Computer Research and Development, 2019, vol. 56, No. 2, pp. 227-239.

Zhang et al., "Key Technology of Data Cache in Dispatching Control System Based on Distributed Memory Cluster," 2020 IEEE 4th Information Technology, Networking, Electronic and Automation Control Conference (ITNEC 2020), 2020, pp. 656-660.

* cited by examiner

| BlockID | Flag | Addr | Heat |
|---------|------|-------|---------|
| Block_1 | LC | laddr | Count_1 |
| Block_2 | RA | raddr | Count_2 |
| ... | ... | ... | ... |
| Block_n | RU | NULL | Count_n |

COMPUTING STORAGE SEPARATION SYSTEM AND DATA ACCESS METHOD THEREFOR, MEDIUM, AND ELECTRONIC DEVICE

CROSS-REFERENCE TO RELATED APPLICATIONS

This is a national stage application filed under 37 U.S.C. 371 of International Patent Application No. PCT/CN2022/088168, filed Apr. 21, 2022, which claims the priority of the Chinese patent application No. 202110615703.5, filed on Jun. 2, 2021 and titled "COMPUTING STORAGE SEPARATION SYSTEM AND DATA ACCESS METHOD THEREFOR, MEDIUM, AND ELECTRONIC DEVICE", the disclosures of which are incorporated herein by reference in their entireties.

TECHNICAL FIELD

The present disclosure relates to the technical field of computers, in particular to a computing storage separation system and a data access method therefor, a medium, and an electronic device.

BACKGROUND

A master-slave structure is a classical configuration solution of a computing storage separation system in a distributed system. The master node is mainly used for responding to user's operations, processing resource scheduling, service computation, etc.; and the slave node is mainly used for data storage and responding to a request from the master node. The slave node logically belongs to the master node and is dominated by the master node.

For an existing computing storage separation system, only a solid state disk (SSD) is deployed on the slave node, and reading and writing data blocks are completed in a way of bilateral communication between the master node and the slave node. In addition, network data transfer used by the existing computing storage separation system is mainly based on a transfer control protocol (TCP)/Internet protocol (IP). Therefore, the existing computing storage separation system has expensive overheads in three aspects: firstly, a network overhead which mainly refers to network data transfer overheads of the master node and the slave node and a TCP/IP software stack overhead caused by single data access; secondly, a CPU overhead which mainly refers to a time overhead taken by the slave node waiting for the request from the master node and a multi-data-copying overhead; and thirdly, a storage overhead which mainly refers to an input/output (I/O) overhead taken by writing data from a page cache of a memory on the slave node into the SSD. These overheads are all on a key path for data access, which will cause a bottleneck of an overall performance of a system.

SUMMARY

The summary is provided in order to introduce the concepts in a brief form, and these concepts will be described in detail in subsequent specific implementations. The summary is not intended to identify key features or necessary features of technical solutions required for protection or limit the scope of the technical solutions required for protection.

In a first aspect, the present disclosure provides a data access method for a computing storage separation system, including: acquiring a data access request; acquiring, based on a type of the data access request, an index table on a master node of the computing storage separation system or synchronization metadata information of the master node and a slave node of the master node; when the data access request is a data read request, querying an index item of a to-be-read data block in the index table, and reading the to-be-read data block based on an index item query result, wherein the index item in the index table at least includes a storage location attribute and a storage address attribute; and/or when the data access request is a data write request, writing a to-be-written data block into an idle space of a persistent memory on the slave node based on the synchronization metadata information, wherein the synchronization metadata information is used for indicating space occupancy and idleness of the persistent memory.

In a second aspect, the present disclosure provides a computing storage separation system, including an index cache module located on a master node of the computing storage separation system and configured to establish and maintain an index table and a cache table, wherein an index item in the index table at least includes a storage location attribute and a storage address attribute of a data block, and the cache table is used for caching a local data block of the master node; a first remote process call interaction module and a second remote process call interaction module, wherein the first remote process call interaction module is located on the master node, the second remote process call interaction module is located on a slave node of the computing storage separation system, the first remote process call interaction module and the second remote process call interaction module are configured to store synchronization metadata information of the master node and the slave node, and the synchronization metadata information is used for indicating space occupancy and idleness of a persistent memory on the slave node; a persistent storage module configured to manage storage spaces of a persistent memory and a solid state disk on the master node; and a data access module located on the master node. The data access module is configured to: acquire a data access request; acquire the index table or the synchronization metadata information based on a type of the data access request; when the data access request is a data read request, query an index item of a to-be-read data block in the index table, and read the to-be-read data block based on an index item query result; and/or when the data access request is a data write request, write a to-be-written data block into an idle space of the persistent memory based on the synchronization metadata information.

In a third aspect, the present disclosure provides a computer-readable medium, having a computer program stored thereon. The program, when executed by a processor, implements the steps of the method in the first aspect of the present disclosure.

In a fourth aspect, the present disclosure provides an electronic device, including: a memory, having a computer program stored thereon; and a processor configured to execute the computer program in the memory so as to implement the steps of the method in the first aspect of the present disclosure.

BRIEF DESCRIPTION OF DRAWINGS

The above-mentioned and other features, advantages and aspects of embodiments of the present disclosure will become more apparent in conjunction with the accompanying drawings and with reference to the following specific implementations. In the accompanying drawings, same or similar numerals in the accompanying drawings represent the same or similar elements. It should be understood that the accompanying drawings are schematic, and components and elements are not necessarily drawn in proportion. In the accompanying drawings:

FIG. 8*a* to FIG. 8*l* show schematic flow diagrams of synchronizing data in a persistent memory into an SSD.

DESCRIPTION OF EMBODIMENTS

Embodiments of the present disclosure will be described below in more detail with reference to the accompanying drawings. Some embodiments of the present disclosure are shown in the accompanying drawings, however, it should be understood that the present disclosure can be implemented in various forms, and should not be explained to be limited to the embodiments described herein, and conversely, these embodiments are provided for understanding the present disclosure more thoroughly and completely. It should be understood that the accompanying drawings and embodiments of the present disclosure are only intended to achieve an exemplary purpose, rather than to limit the protection scope of the present disclosure.

It should be understood that various steps recorded in implementations of the method in the present disclosure can be performed according to different orders and/or concurrently. In addition, the implementations of the method may include additional steps and/or omit the execution of the shown steps. The scope of the present disclosure is not limited in this aspect.

The term "including" and variants thereof used herein are interpreted as open inclusion, i.e., "including, but not limited to". The term "based on" is "at least partially based on". The term "one embodiment" represents "at least one embodiment"; the term "another embodiment" represents "at least one another embodiment"; and the term "some embodiments" represents "at least some embodiments". Relevant definitions of other terms will be given in the following description.

It should be noted that concepts such as "first" and "second" mentioned in the present disclosure are only intended to distinguish different apparatuses, modules or units, rather than to limit an order of functions executed by these apparatuses, modules or units or an interdependence therebetween.

It should be noted that modifications of "one" and "a plurality of" mentioned in the present disclosure are schematic rather than restrictive. It should be understood by the skilled in the art that they should be understood as "one or more" unless explicitly indicated in the context.

Names of messages or information interacted among a plurality of apparatuses in the implementations of the present disclosure are only for illustrative purposes, but are not intended to limit ranges of these messages or information.

Figure 1:
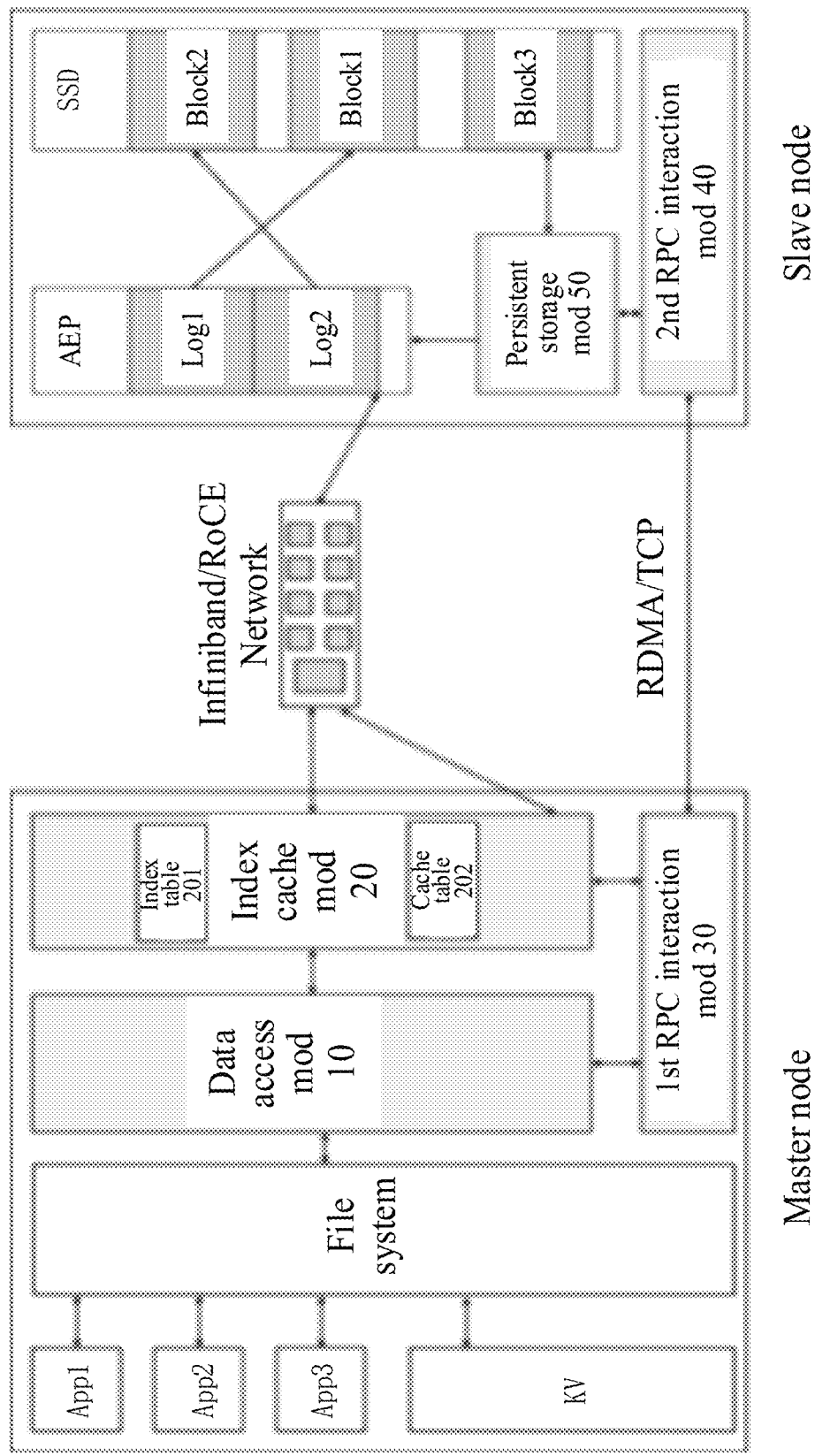
FIG. 1 is a schematic diagram of an overall structure of a computing storage separation system according to an embodiment of the present disclosure.

Firstly, an overall structure of a computing storage separation system according to an embodiment of the present disclosure is described. As shown in FIG. 1, the computing storage separation system according to the embodiment of the present disclosure includes a data access module 10, an index cache module 20, a first RPC (Remote Process Call) interaction module 30, a second RPC interaction module 40 located on a slave node, and a persistent storage module 50. The data access module 10 is responsible for converting and packaging local data block access from a user into data block access to a slave node on a distal end or a local cache of a master node; the index cache module 20 is responsible for establishing and maintaining an index and a cache of a data block so as to support rapid data block read and write service; the first RPC interaction module 30 and the second RPC interaction module 40 are responsible for performing lightweight metadata synchronization and providing a necessary data transfer guarantee to guarantee the correct cognition by the master node of a space of the slave node and a location of the data block; and the persistent storage module 50 is responsible for managing storage spaces of a persistent memory (such as an ApachePass, AEP, memory) and an SSD (Solid State Disk) and the synchronization of storing data in the persistent memory into the SSD. The AEP in FIG. 1 is only an example of the persistent memory, and does not constitute a limitation on the present disclosure. Although the persistent memory is shown in FIG. 1 with the AEP as an example, in fact, the persistent memory may also be other types of persistent memories other than the AEP.

In some embodiments, the index cache module 20 is responsible for establishing and maintaining an index table 201 and a cache table 202. The index table 201 at least includes a storage location attribute and a storage address attribute of a data block, and the cache table 202 is used for caching a local data block of the master node, that is, the cache table 202 is a cache of the data block on the master node, and the granularity of the cache is the granularity of an SSD block on the slave node. In this way, the index cache module 20 can establish and maintain the index and the cache of the data block so as to support the rapid block data read and write service.

Figures 2, 3:
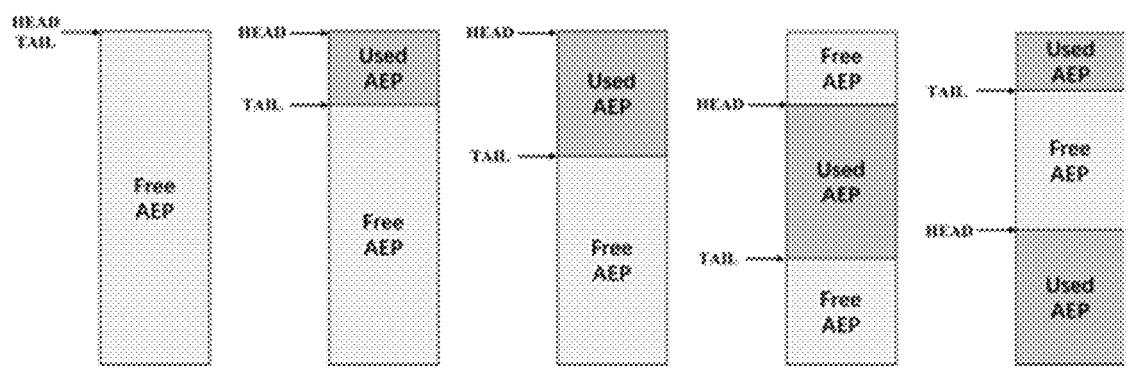
FIG. 2 shows a schematic diagram of a data structure of an index table.
FIG. 3 shows a schematic diagram of double-pointer space management for a persistent memory.

The index table 201 may be an index table of any structure, for example, the index table 201 may be established based on a cuckoo Hash table, and a Hash key thereof is a BlockID. FIG. 2 shows a schematic diagram of a data structure of an index table 201. As shown in FIG. 2, the index table 201 includes a plurality of index items, and each index item includes four attributes.

The first attribute is the BlockID and is used for recording a corresponding SSD data block number.

The second attribute is Flag and is used for marking a storage state of data. According to the storage state of the data, there may be specifically one of the following three types: LC (locally-cached) means that the data block is locally cached in the cache table 202 of the master node; RA (READ-Available) means that the data block is in the persistent memory (such as the AEP) of the slave node and may be directly accessed through a RDMA (Remote Direct Memory Access) READ command; and RU (READ-Unavailable) means that the data block is on the SSD of the slave node and may not be accessed through the RDMA READ command.

The third attribute is Addr and is used for representing a memory address of the data block on the local site (i.e., in the cache table 202 of the master node) or a distal end (i.e., the persistent memory or SSD of the slave node). It should be noted that, for the data block whose Flag is a RU, the content of Addr is meaningless because such a data block cannot be stored in a local cache table of the master node or the persistent memory of the slave node.

The fourth attribute is Heat and is used for counting the hotness of the data block. An access count value of the data block will be changed every time when the data block is accessed. The higher the access count value, the hotter the data, and the more it should be stored in the cache table 202. The access count value will be periodically set to avoid data overflow.

Of course, the Flag attribute and the Addr attribute are necessary; and the BlockID attribute and the Heat attribute are optional, that is, it is possible that the BlockID attribute and the Heat attribute are not included in the index items.

In some embodiments, the data access module 10 is configured to acquire a data access request. For example, it may acquire a data access request from a user by means of a block storage interface of the master node. Then, the data access module 10 may acquire, based on a type of the data access request, an index table or synchronization metadata information; when the data access request is a data read request, query an index item of a to-be-read data block in the index table 201, and read the to-be-read data block based on an index item query result; and/or when the data access request is a data write request, write a to-be-written data block into an idle space of a persistent memory based on the synchronization metadata information. The synchronization metadata information is used for indicating space occupancy and idleness of the persistent memory.

For example, the data access module 10 may convert and package block access from a user to a local disk of the master node into an RDMA operation for a slave node on a distal end. In an embodiment, the data access module 10 may convert a block read command into an RDMA READ command and convert a block write command into a RDMA WRITE command. A target address of RDMA READ/WRITE is an accessible virtual address exposed of the persistent memory on the slave node by mmap-DAX.

The first RPC interaction module 30 and the second RPC interaction module 40 are responsible for synchronizing key metadata information on the master node and the slave node. For example, the two modules are configured to perform synchronization of information indicating space occupancy and idleness of the persistent memory on the slave node by mutual communication, and thus, the correct cognition by the master node of a space of the slave node and a location of the data block can be guaranteed, that is, a lightweight metadata synchronization guarantee and a necessary data transfer guarantee are provided.

In one embodiment, the space management for the persistent memory on the master node and the slave node is done based on a double-pointer technology. FIG. 3 shows a schematic diagram of double-pointer space management for a persistent memory. As shown in FIG. 3, a double-pointer solution includes two pointers, i.e., a HEAD pointer and a TAIL pointer. The HEAD pointer always points to a starting position of an occupied space (i.e., Used AEP in FIG. 3); and oppositely, the TAIL pointer always points to an end of the occupied space. Free AEP in FIG. 3 refers to an idle space. Both of the master node and the slave node may maintain and update the two pointers as required. An invariant constraint is that the HEAD pointer is always behind the TAIL pointer on both of the master node and the slave node. In addition, a value of the TAIL pointer on the master node is always ahead of or equal to a value of the TAIL pointer on the slave node, which is due to a fact that the master node will continuously write data into the latest idle space of the persistent memory and update its TAIL pointer in real time; and oppositely, a value of the HEAD pointer on the slave node is always ahead of or equal to a value of the HEAD pointer on the master node, which is due to a fact that a process of synchronizing the data in the occupied space of the persistent memory into the SSD is controlled by the slave node, and the slave node will update its HEAD pointer in real time after the data is synchronized into the SSD. The key metadata information described above includes the values of the HEAD pointer and the TAIL pointer.

In some embodiments, the persistent storage module 50 is deployed on the slave node and is responsible for managing the storage spaces of the persistent memory and the SSD and the synchronization of storing the data in the persistent memory into the SSD. By means of the persistent storage module 50, when there is an insufficient storage space on the persistent memory, a certain occupied space of the persistent memory can be released, and some data blocks that get hotter in the SSD can be copied into the persistent memory to support the subsequent rapid RDMA access, for example, the RDMA READ is used to directly read the persistent memory so as to acquire block data.

By adopting the above-mentioned technical solutions, the index cache module 20 may be responsible for establishing and maintaining the index table 201 and the cache table 202 of the data block, the data access module 10 can convert, based on the index table or the synchronization metadata information between the master node and the slave node, the data access request into access to data in the persistent memory on the slave node or access to the cache table, so that the computing storage separation system according to the embodiment of the present disclosure is capable of supporting the decoupling deployment of a computing service and a storage service, and supporting low-latency and high-throughput block access service while ensuring data consistency, thereby reducing the network overhead, CPU overhead and storage overhead of data access.

A data access method for a computing storage separation system according to an embodiment of the present disclosure will be described below in conjunction with the architecture of the computing storage separation system described above.

Figure 4:
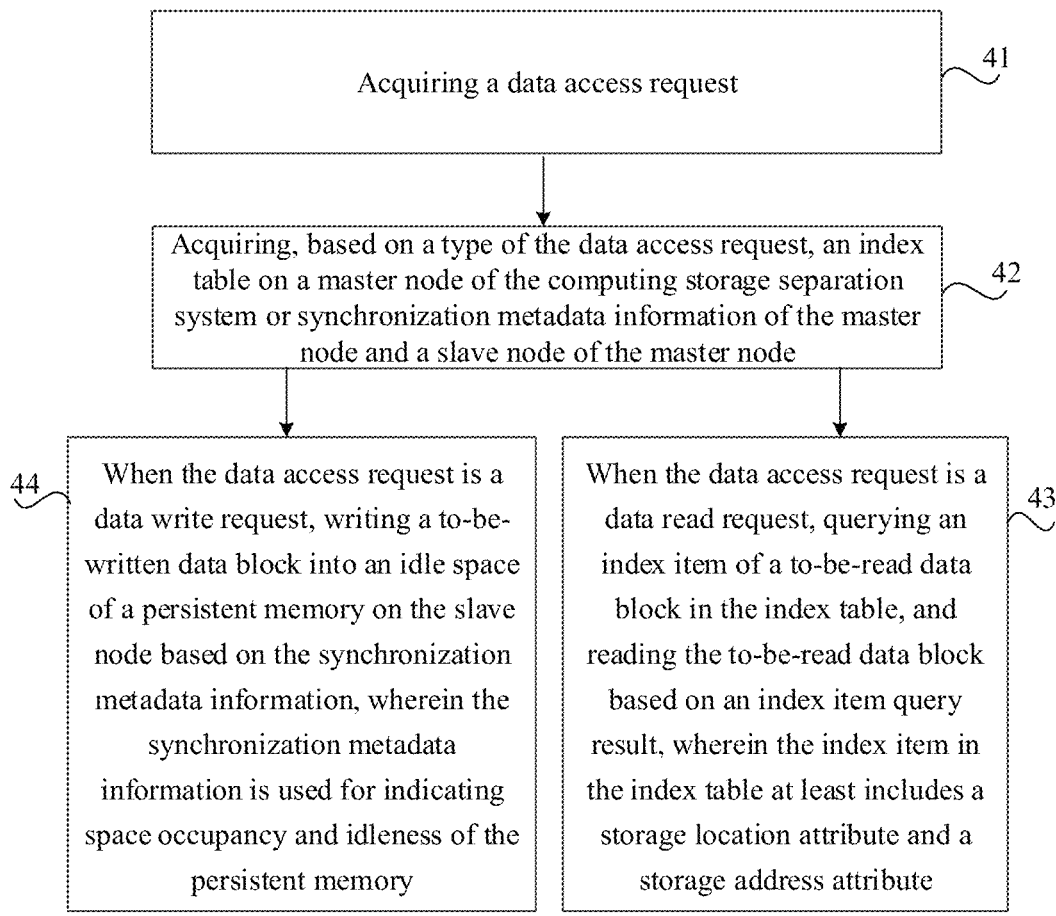
FIG. 4 shows a flow diagram of a data access method for a computing storage separation system according to an embodiment of the present disclosure.

FIG. 4 shows a flow diagram of a data access method for a computing storage separation system according to an embodiment of the present disclosure. As shown in FIG. 4, the method includes the following steps S41 to S43.

In step S41, a data access request is acquired;

in step S42, the index table or the synchronization metadata information is acquired based on a type of the data access request;

in step S43, when the data access request is a data read request, an index item of a to-be-read data block in the index table on the master node is queried, and the to-be-read data block is read based on an index item query result, wherein the index item of the index table at least includes a storage location attribute and a storage address attribute; and/or in step S44, when the data access request is a data write request, a to-be-written data block is written into an idle space of a persistent memory on the slave node based on the synchronization metadata information, wherein the synchronization metadata information is used for indicating space occupancy and idleness of the persistent memory.

By adopting the above-mentioned technical solutions, the data access request can be converted, based on the index table or the synchronization metadata information between the master node and the slave node, into access to data in the persistent memory on the slave node or access to the cache table, so that the data access method for the computing storage separation system according to the embodiment of the present disclosure is capable of supporting the decoupling deployment of a computing service and a storage service, and supporting low-latency and high-throughput block access service while ensuring data consistency, thereby reducing the network overhead, CPU overhead and storage overhead of data access.

Figure 5:
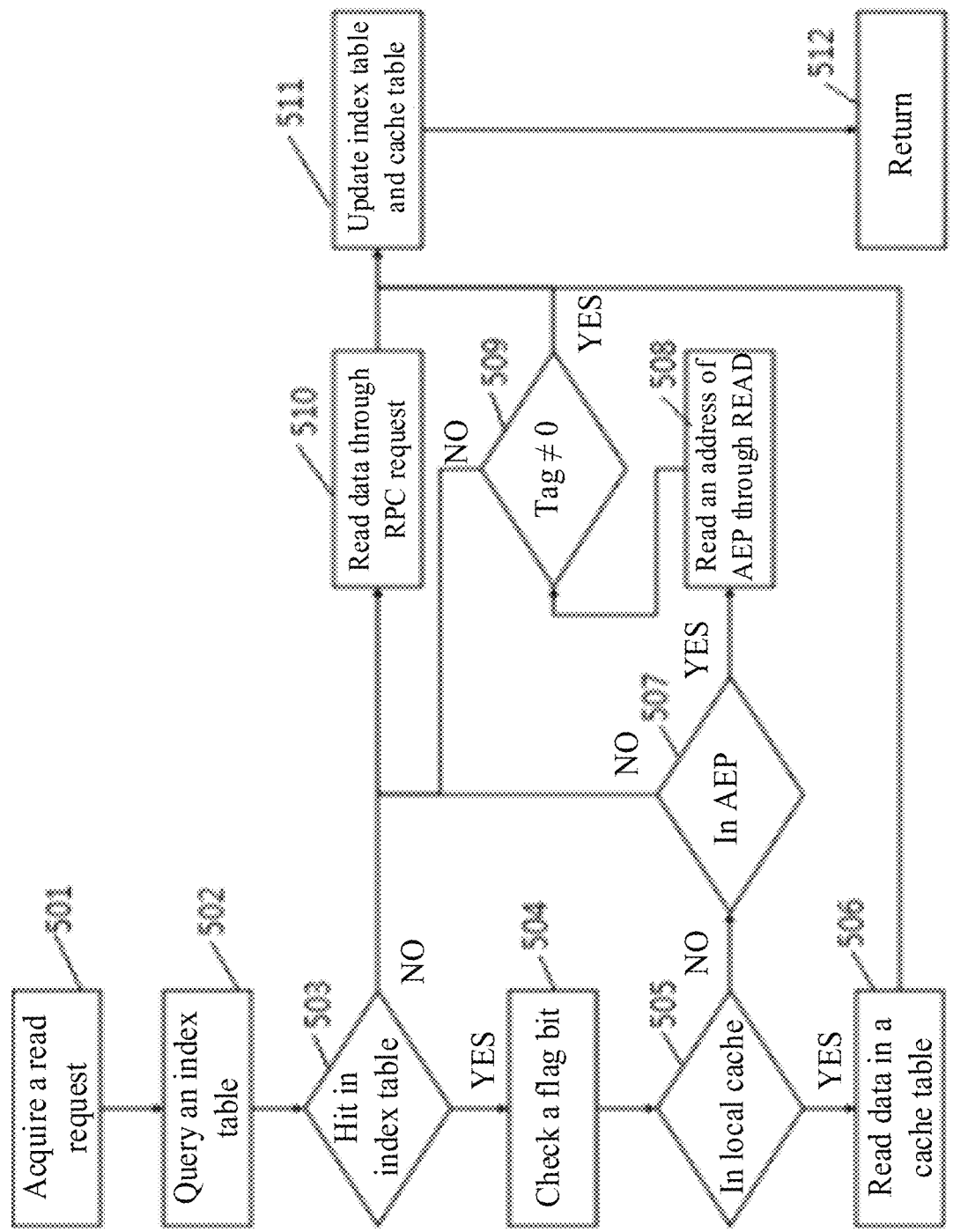
FIG. 5 shows a flow diagram of an operation of reading block data when a data access request is a data read request.

FIG. 5 shows a flow diagram of an operation of reading block data when a data access request is a data read request. A basic process of reading data is that: the index item of the to-be-read data block is queried in the index table on the master node; when the storage location attribute of the queried index item indicates that the to-be-read data block is stored in a local cache table of the master node, the to-be-read data block is read from the cache table based on the storage location attribute of the queried index item; when the storage location attribute of the queried index item indicates that the to-be-read data block is stored in the persistent memory, the to-be-read data block is read from the persistent memory by means of remote direct memory access based on the storage location attribute of the queried index item; when the storage location attribute of the queried index item indicates that the to-be-read data block is stored in a solid state disk on the slave node, the to-be-read data block from the solid state disk is read by means of remote process call based on the storage location attribute of the queried index item; and when the index item of the to-be-read data block is not queried, the to-be-read data block is read from the slave node by means of remote process call.

As shown in FIG. 5, firstly, in step S501, the data access module 10 acquires a data read request from a user through a block storage interface of the master node, wherein the data read request may include a BlockID.

Then, in step S502, the data access module 10 redirects data block read access to the index table 201 in the index cache module 20 based on the data read request and queries the index item of the to-be-read data block from the index table 201.

Then, in step S503, the data access module 10 determines whether there is a hit in the index table, that is, determines whether the index item of the to-be-read data block is queried in the index table 201. When the index item of the to-be-read data block is queried, step S504 is performed; and when the index item of the to-be-read data block is not queried, step S510 is performed.

In step S504, since the index item of the to-be-read data block is queried in step S503, a Flag tag of the index item is further checked, and step S505 is performed.

Then, in step S505, it is determined, based on the Flag tag, whether the to-be-read data block is in the local cache table of the master node. When the Flag tag checked in step S504 is LC, it indicates that the to-be-read data block is in the local cache table of the master node, and step S506 is performed. When the Flag tag checked in step S504 is not LC, it indicates that the to-be-read data block is not in the local cache table, and step S507 is performed.

In step S506, the data access module 10 directly reads data of the to-be-read data block from the cache table 202, and step S511 is performed.

In step S507, it is determined whether the to-be-read data block is in the persistent memory or whether the to-be-read data block only exists in the SSD of the slave node. When the Flag tag checked in step S504 is RA, it indicates that the to-be-read data block is in the persistent memory of the slave node, and step S508 is performed. When the Flag tag checked in step S504 is not RA, it indicates that the Flag tag is RU, that is, the to-be-read data block only exists in the SSD of the slave node, and step S510 is performed.

In step S508, the data access module 10 directly reads the to-be-read data block from the persistent memory through a RDMA READ command, for example, RDMA READ may be performed by means of an Infiniband/RoCE network in FIG. 1. A data length of the to-be-read data block may be a block length of a data block packaged by a write operation. Then, step S509 is performed.

In step S509, it is determined whether the read data block is valid. For example, it may be determined whether the tag of the read data block is 0; when the tag is 0, it indicates that the read data block is invalid, and step S510 is performed; and when the tag is not 0, it indicates that the read data block is valid, and step S511 is performed. By step S509, the situation can be avoided where the to-be-read data block is returned by mistake due to being synchronized back into the SSD by the persistent storage module 50 of the slave node and thus invalidated.

In step S510, since the index item of the to-be-read data block is not queried in step S503, or the data block read through the RDMA READ command is invalid, or it is determined, based on the Flag tag, that to-be-read data is stored in the SSD, the to-be-read data block is read by means of remote process call. That is, the data access module 10 sends a data read request to the first RPC interaction module 30, the first RPC interaction module 30 sends the received data read request to the second RPC interaction module 40, and the second RPC interaction module 40 reads the to-be-read data block from the SSD according to the data read request. Then, step S511 is performed.

Then, in step S511, after the to-be-read data block is successfully read, the index cache module 20 on the master node needs to correspondingly update its index table 201 and cache table 202. Then, return.

By adopting the above-mentioned technical solutions, the data access request can be converted into access to data in the persistent memory on the slave node or access to the cache table, so that the data access method for the computing storage separation system according to the embodiment of the present disclosure is capable of supporting the decoupling deployment of a computing service and a storage service, and supporting low-latency and high-throughput block access service while ensuring data consistency, thereby reducing the network overhead, CPU overhead and storage overhead of data access.

Figure 6:
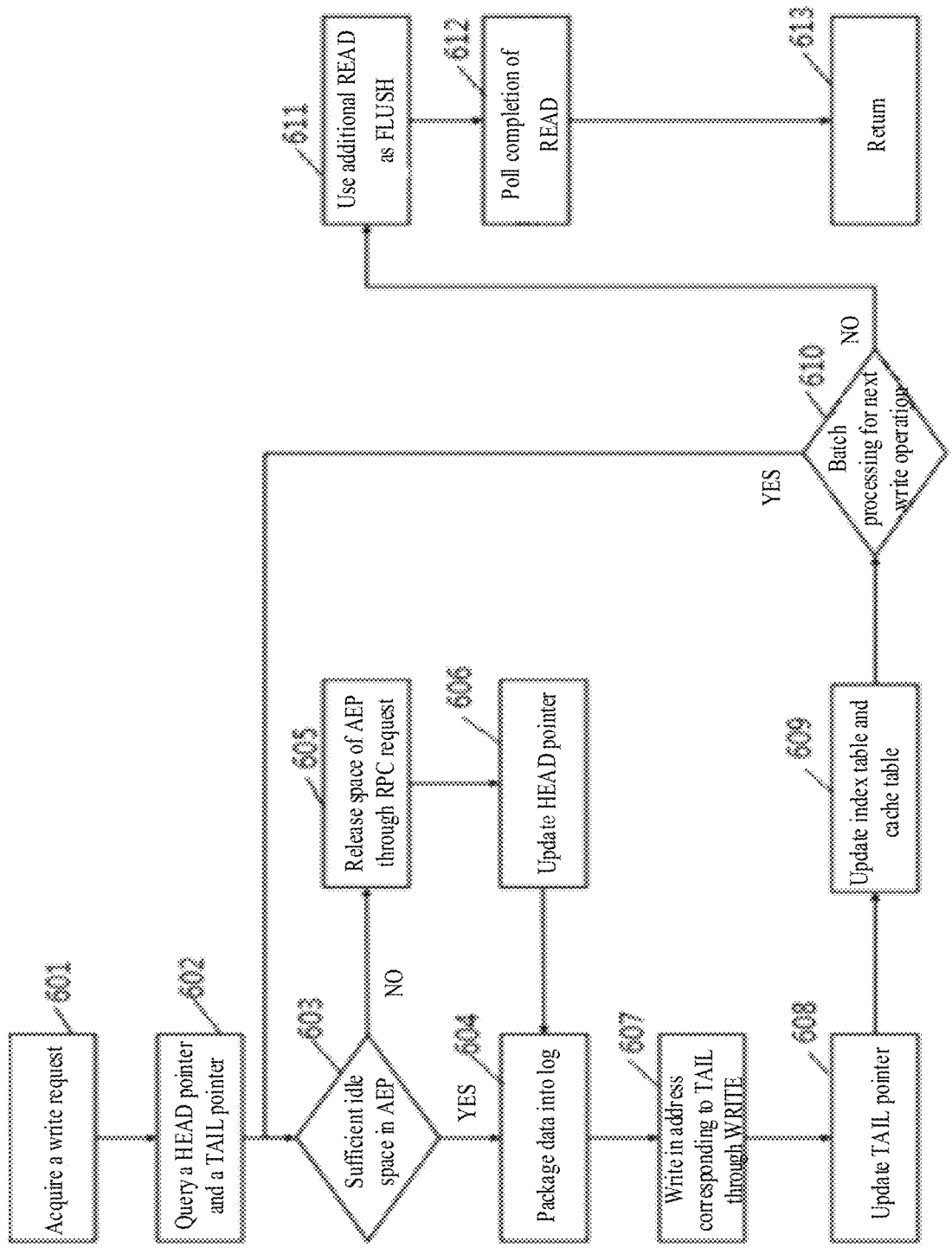
FIG. 6 shows a flow diagram of an operation of writing block data when a data access request is a data write request.

FIG. 6 shows a flow diagram of an operation of writing a data block when a data access request is a data write request.

As shown in FIG. 6, firstly, in step S601, the data access module 10 acquires a data write request from a user through a block storage interface of the master node, wherein the data write request includes a BlockID.

Then, in step S602, the data access module 10 redirects data block write access to the idle space of the persistent memory on the slave node based on the data write request.

In one embodiment, the data access module 10 may query the HEAD pointer and the TAIL pointer which are stored and maintained by the first RPC interaction module 30, and step S603 is performed.

In step S603, the data access module 10 determines whether there is a sufficient idle space in the persistent memory. When there is an insufficient space, step S605 is performed; and when there is a sufficient space, step S604 is performed.

In step S605, the first RPC interaction module 30 on the master node sends a space release request to the second RPC interaction module 40 on the slave node, so that the persistent storage module 50 on the slave node passively triggers a process of synchronizing the data in the persistent memory into the SSD, thereby releasing more idle space. That is, the first RPC interaction module 30 sends the space release request to the second RPC interaction module 40, and then, the second RPC interaction module 40 forwards the space release request to the persistent storage module 50, so that the persistent storage module 50 passively triggers the process of synchronizing the data in the persistent memory into the SSD. After the synchronization is ended, the space in the persistent memory is released, thereby being sufficient to write in the to-be-written data block. Then, step S606 is performed. A process of the persistent storage module 50 synchronizing the data in the persistent memory into the SSD will be described hereinafter in detail in conjunction with FIG. 8. The synchronization herein includes a process of the persistent storage module 50 actively performing synchronization and a process of the persistent storage module 50 passively triggering synchronization.

In step S606, the first RPC interaction module 30 on the master node performs metadata synchronization by means of the second RPC interaction module 40 on the slave node, thereby obtaining an updated HEAD pointer. Then, step S604 is performed.

Figure 7:
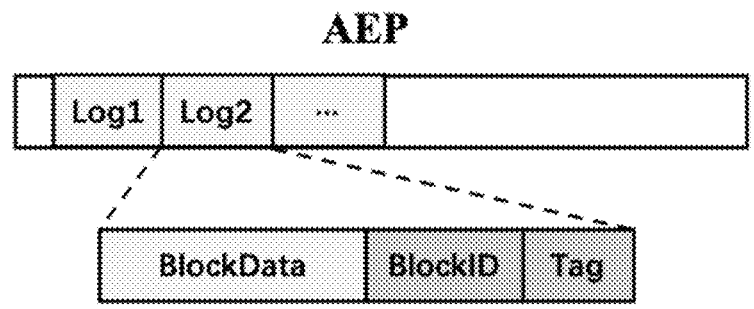
FIG. 7 shows an exemplary log data structure.

In step S604, since at the moment there is a sufficient idle space in the persistent memory, the data access module 10 on the master node packages block data. The block data may be packaged in any structure. FIG. 7 shows an exemplary log data structure. As shown in FIG. 7. The log data structure further includes a BlockID and a Tag in addition to the block data itself. The Tag is used for representing the integrity of data, wherein non-zero indicates that all complete data is persisted onto the persistent memory, otherwise it indicates that the data is incomplete (which may be partially written caused by a fault) and needs to be discarded. After package is ended, step S607 is performed.

In step S607, the data access module 10 writes, through a RDMA WRITE command, the packaged data block into an address corresponding to the TAIL pointer, and step S608 is performed.

In step S608, the values of the TAIL pointers maintained by the first RPC interaction module 30 and the second RPC interaction module 40 are updated in real time, and step S609 is performed.

In step S609, the index cache module 20 correspondingly updates the index table 201 and the cache table 202. Step S610 is performed.

In step S610, in order to improve performances, the data access module 10 may consider, according to a time delay requirement etc., whether batch processing is performed for next write access to the data block. By the batch processing, an additional network transfer overhead brought by submitting can be reduced. When the batch processing is performed, step S603 is performed; and when the batch processing is not performed, step S611 is performed.

In step S611, an additional RDMA READ command is used as a FLUSH (refreshing) operation.

Then, in step S612, after the data access module 10 polls the completion of the work of the RDMA READ command on the master node, it can be affirmed that the write of the block data has been completely persisted onto the persistent memory of the slave node. Then, return.

By adopting the above-mentioned technical solutions, the data access request can be converted into access to data in the persistent memory on the slave node or access to the cache table, so that the data access method for the computing storage separation system according to the embodiment of the present disclosure is capable of supporting the decoupling deployment of a computing service and a storage service, and supporting low-latency and high-throughput block access service while ensuring data consistency, thereby reducing the network overhead, CPU overhead and storage overhead of data access.

FIG. 8 shows a schematic flow diagram of synchronizing data in a persistent memory into an SSD.

The persistent storage module 50 is responsible for managing the storage spaces of the persistent memory and the SSD on the slave node, and it may actively or passively trigger the synchronization of the data in the persistent memory back into the SSD to release the space in the persistent memory so as to allow the master node to write in more data. The persistent storage module 50 may synchronize the data in the persistent memory into the SSD from the position of the HEAD pointer of the slave node. After the synchronization is completed, the slave node will update the value of the local HEAD pointer and moves forwards. Next, the process of synchronization will be described in detail.

Figure 8A:
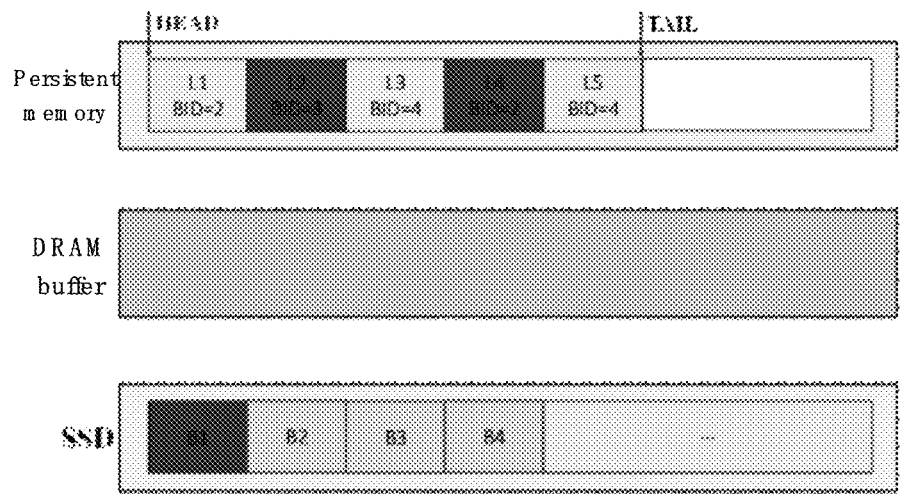

As shown in FIG. 8, firstly, in FIG. 8*a* shows a schematic diagram of space states of the persistent memory and the SSD before storage synchronization. Dark black blocks (such as B1, L2, and L4) represent hot data, light grey blocks (such as L1, L3, and L5) represent cold data, grey blocks (such as B2, B3, and B4) represent invalid data. If not emphasized, the HEAD pointer and the TAIL pointer are each default to be a persistent memory management pointer on the slave node.

Figure 8B:
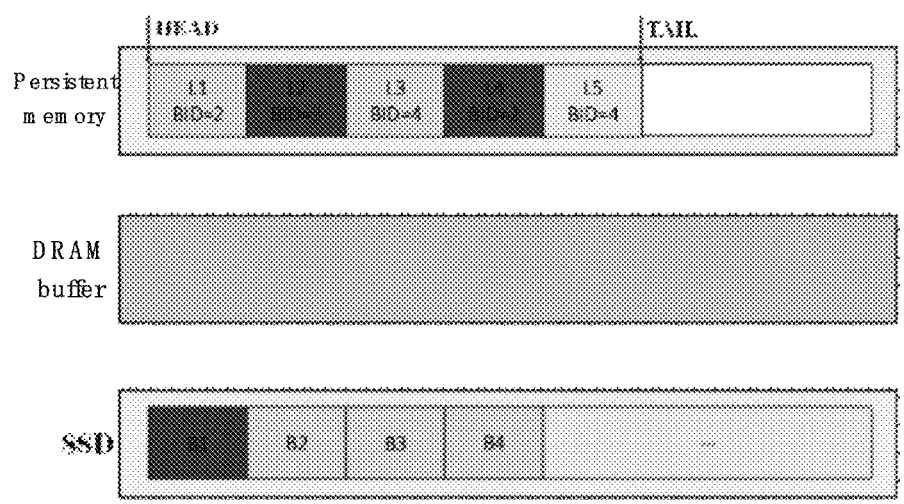

Then, in FIG. 8*b*, the persistent storage module 50 sets expired log items (i.e., log items covered by a subsequent updated log item with the same BlockID) by backwardly (or forwardly) searching data between the locally stored TAIL pointer to the HEAD pointer, that is, Tags of these expired log items are marked as 0.

Figure 8C:
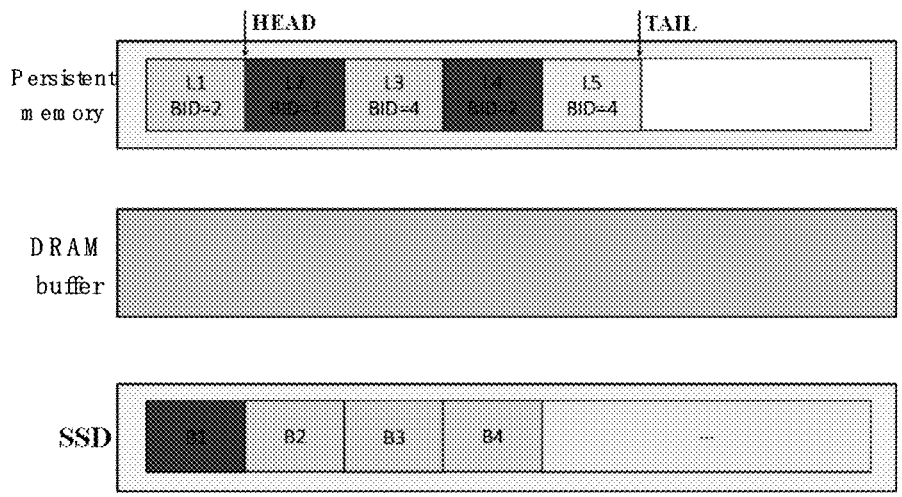

Then, in FIG. 8*c*, the persistent storage module 50 controls the HEAD pointer of the persistent memory to move forwards to the next valid log item.

Figure 8D:
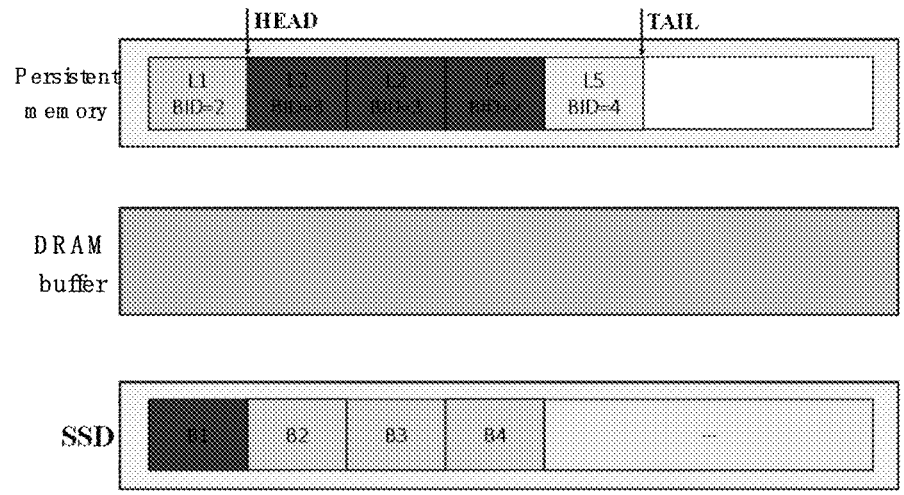

Then, in FIG. 8*d*, the persistent storage module 50 copies the hot data in the persistent memory to an idle position closest to the TAIL pointer.

Figure 8E:
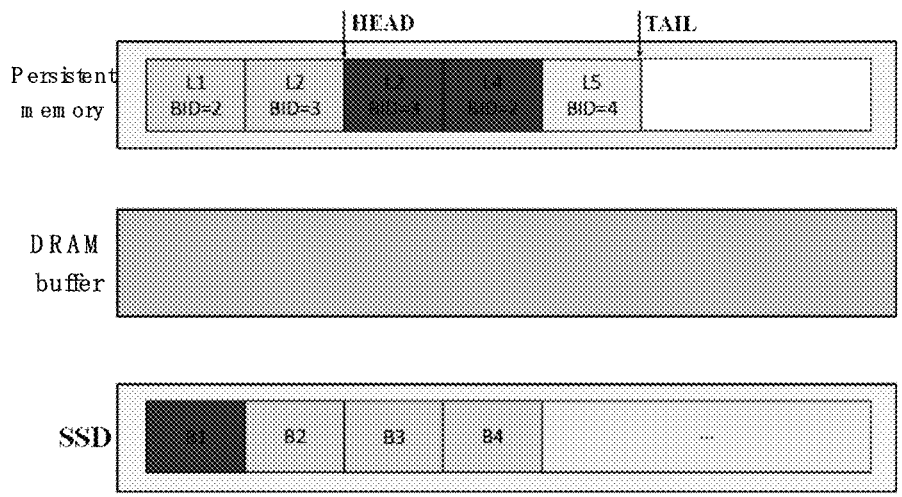

Then, in FIG. 8*e*, the persistent storage module 50 releases the storage space occupied by a hot log item before copy in the persistent memory, and the HEAD pointer is moved.

Figure 8F:
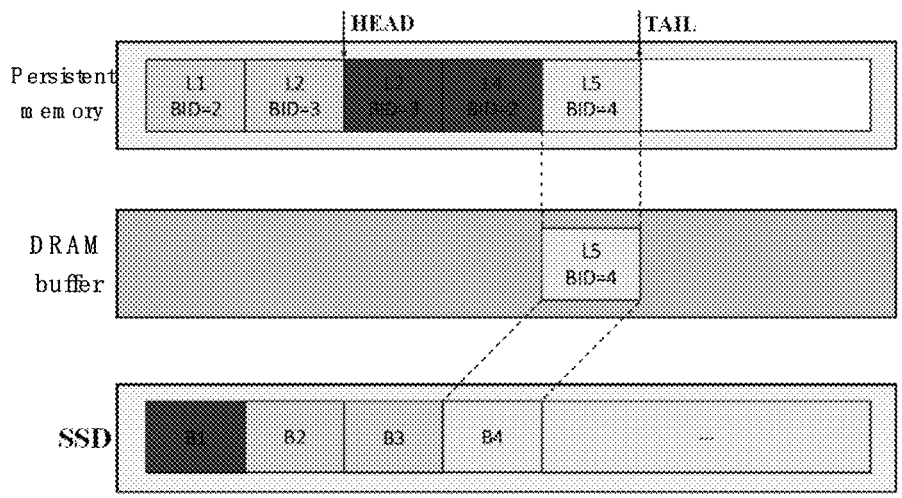

Then, in FIG. 8*f*, the persistent storage module 50 pops up data in a cold log item in the persistent memory to the corresponding SSD block to release the occupied space of the persistent memory.

Figure 8G:
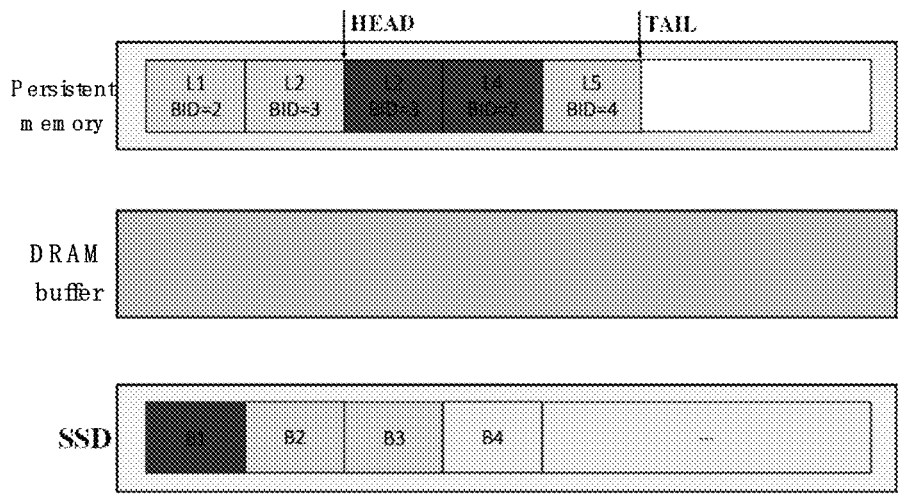

Then, in FIG. 8*g*, the persistent storage module 50 sets a log item completing data synchronization in the persistent memory to be invalid.

Figure 8H:
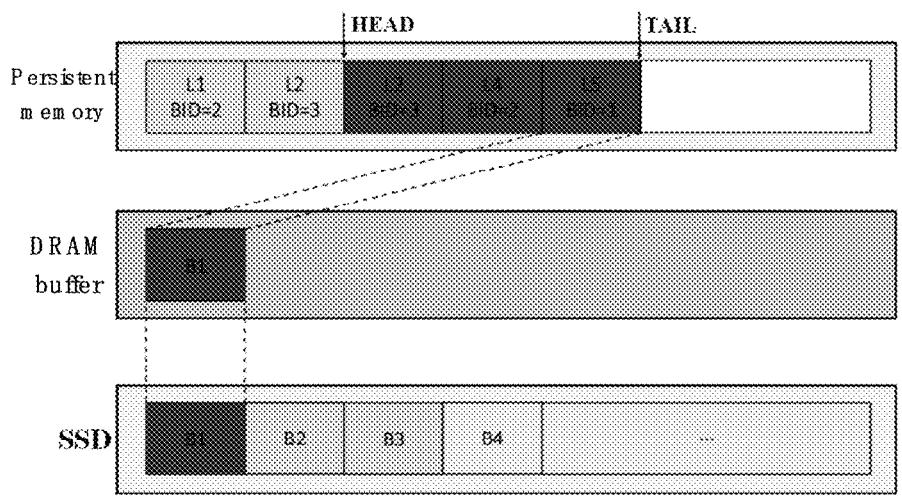

Then, in FIG. 8h, the persistent storage module 50 extracts a hot data block in the SSD into an idle space between the HEAD pointer and the TAIL pointer in the persistent memory.

Figure 8I:
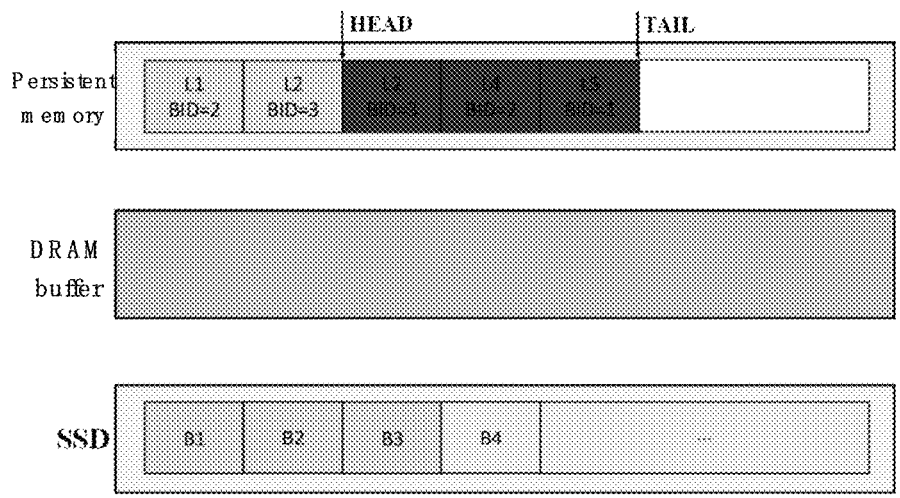

Then, in FIG. 8i, the persistent storage module 50 sets the data block in the SSD which has been extracted from the SSD to the persistent memory to be invalid.

Figure 8J:
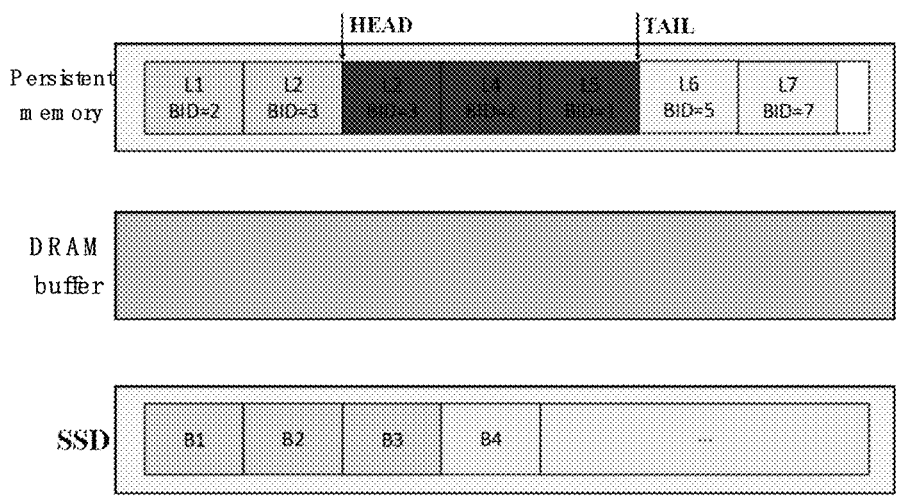

Then, FIG. 8j shows a schematic diagram of a new write operation existing in the persistent memory during data synchronization of the persistent memory and the SSD.

Figure 8K:
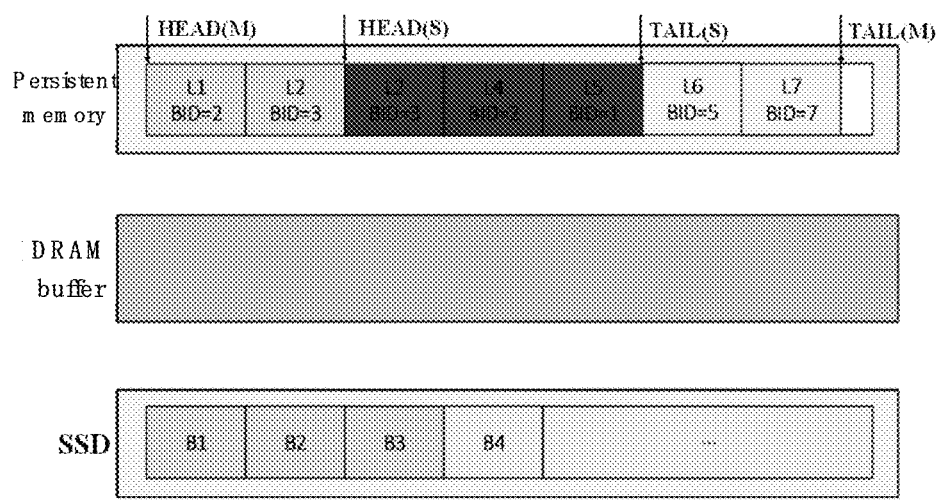
Figure 8I:
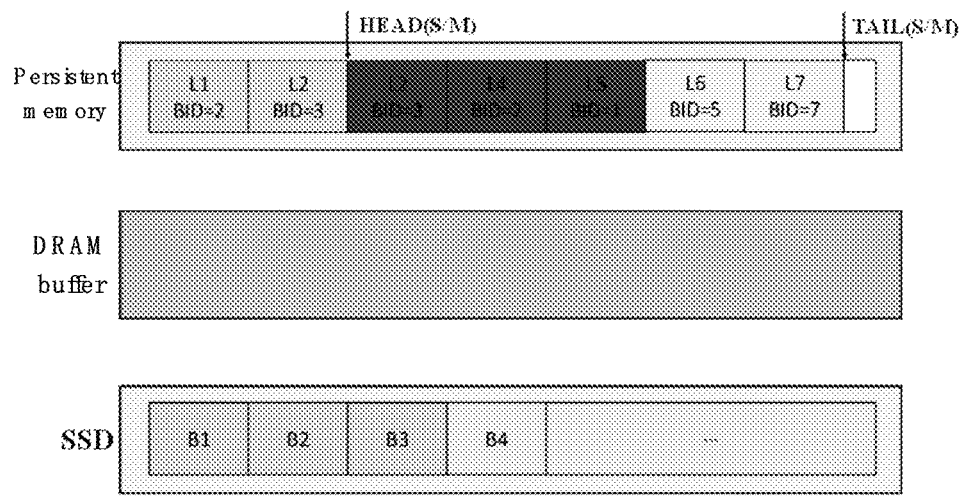

Then, FIG. 8k shows a schematic diagram of a cognitive difference in the space states between the master node and the slave node before the first RPC interaction module 30 and the second RPC interaction module 40 perform metadata synchronization.

Then, FIG. 8l shows a schematic diagram of cognitive consistency of the space states between the master node and the slave node after the first RPC interaction module 30 and the second RPC interaction module 40 perform metadata synchronization.

In addition, it should be noted that although the persistent memory is shown in the accompanying drawings of the present disclosure with an AEP as an example, the persistent memory may also be other types of persistent memories other than the AEP.

It should be noted that the hot log item synchronized back to the SSD or a source log item copied to an adjacent area of the TAIL pointer needs to be invalidated, that is, Tag is also marked as 0. In addition, when there is a sufficient release space in the AEP, the persistent storage module 50 may copy some data blocks getting hotter in the SSD back into the AEP to support the subsequent rapid RDMA access, that is, the RDMA READ is used to directly read the persistent memory so as to acquire block data. The master node may also perform new read and write operations while the slave node performs the data synchronization of the persistent memory and the SSD as well as cold and hot data exchange, and they are asynchronously performed. The slave node and the master node may acquire consistent views of the HEAD pointer and the TAIL pointer by the metadata synchronization between the first RPC interaction module 30 and the second RPC interaction module 40 to support safe and efficient block data read and write service.

Below, refer to FIG. 9 which shows a schematic structural diagram suitable for implementing an electronic device 600 in an embodiment of the present disclosure. A terminal device in the embodiment of the present disclosure may include, but is not limited to a mobile terminal such as a mobile phone, a notebook computer, a digital broadcast receiver, a PDA (Personal Digital Assistant), a PAD (Tablet Computer), a PMP (Portable Multimedia Player), and a vehicle-mounted terminal (e.g. a vehicle-mounted navigation terminal), and a fixed terminal such as a digital TV and a desktop computer. The electronic device shown in FIG. 9 is only an example, and should not bring any limitations on a function and use range of the embodiment of the present disclosure.

Figure 9:
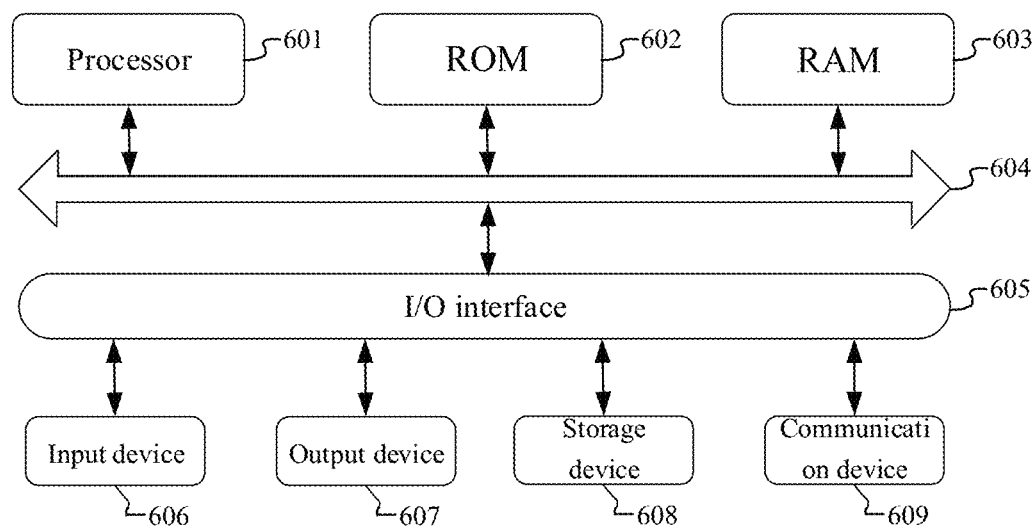
FIG. 9 is a schematic structural diagram of an electronic device according to an embodiment of the present disclosure.

As shown in FIG. 9, the electronic device 600 may include a processor (such as a central processing unit and a graphics processing unit) 601 which may perform various appropriate actions and processing according to a program stored in a read-only memory (ROM) 602 or a program loaded from a storage device 608 to a random access memory (RAM) 603. In the RAM 603, various programs and data required for operating the electronic device 600 are further stored. The processor 601, the ROM 602 and the RAM 603 are connected to each other by a bus 604. An input/output (I/O) interface 605 is also connected to the bus 604.

Usually, the following apparatuses, including an input device 606 such as a touch screen, a touchpad, a keyboard, a mouse, a camera, a microphone, an accelerometer, and a gyroscope; an output device 607 such as a liquid crystal display (LCD), a loudspeaker, and a vibrator; a storage device 608 such as a cassette and a hard disk; and a communication apparatus 609, may be connected to the I/O interface 605. The communication apparatus 609 may allow the electronic device 600 to wirelessly or wiredly communicate with other devices so as to exchange data. FIG. 9 shows the electronic device 600 provided with various apparatuses, however, it should be understood that it is not required to implement or provide all the shown apparatuses. Alternatively, more or fewer apparatuses can be implemented or provided.

Particularly, according to the embodiment of the present disclosure, the process described as above with reference to the flow diagram can be implemented as a computer software program. For example, an embodiment of the present disclosure includes a computer program product which includes a computer program borne on a non-transient computer-readable medium, and the computer program includes a program code for performing the method shown in the flow diagram. In such an embodiment, the computer program can be downloaded from a network by the communication apparatus 609 and installed, or installed from the storage device 608, or installed from the ROM 602. When the computer program is executed by the processor 601, the above-mentioned functions limited in the method in the embodiment of the present disclosure are executed.

It should be noted that the above-mentioned computer-readable medium in the present disclosure can be a computer-readable signal medium or a computer-readable storage medium or any combinations of the both mentioned as above. The computer-readable storage medium may include, but is not limited to an electronic, magnetic, optical, electromagnetic, infrared or semiconductor system, apparatus or device, or any combinations thereof. A more specific example of the computer-readable storage medium may include, but is not limited to an electric connection having one or more conducting wires, a portable computer disk, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device or any appropriate combinations thereof. In the present disclosure, the computer-readable storage medium can be any tangible media including or storing a program which can be used by an instruction execution system, apparatus or device or used in combination with the same. In the present disclosure, the computer-readable signal medium may include a data signal propagating in a baseband or as a part of carrier waves, and bear a computer-readable program code thereon. Such propagating data signal can be in various forms including, but not limited to an electromagnetic signal, an optical signal or any appropriate combinations thereof. The computer-readable signal medium can be further any computer-readable media other than the computer-readable storage medium, and the computer-readable signal medium may send, propagate or transmit the program used by the instruction execution system, apparatus or device or used in combination with the same. The program code included by the computer-readable medium can be transferred by any appropriate media including, but not limited to a wire, an optical cable, and an RF (Radio Frequency) or any appropriate combinations thereof.

In some implementations, a client or server may communicate by means of any network protocols, such as a HTTP (HyperText Transfer Protocol), which have been known at present or will be researched or developed in the future, and may communicate (such as a communication network) and be interconnected with digital data in any forms or media. Examples of the communication network include a local area network ("LAN"), a wide area network ("WAN"), an Internet network (such as Internet), a peer-to-peer network (such as ad hoc peer-to-peer network), and any networks which have been known at present or will be researched or developed in the future.

The above-mentioned computer-readable medium can be included in the above-mentioned electronic device, and may also exist alone, but is not assembled in the electronic device.

The above-mentioned computer-readable medium bears one or more programs. When the one or more programs are executed by the electronic device, the electronic device is enabled to acquire a data access request; acquire, based on a type of the data access request, an index table on a master node of the computing storage separation system or synchronization metadata information of the master node and a slave node of the master node; when the data access request is a data read request, query an index item of a to-be-read data block in the index table, and read the to-be-read data block based on an index item query result, wherein the index item in the index table at least includes a storage location attribute and a storage address attribute; and/or when the data access request is a data write request, write a to-be-written data block into an idle space of a persistent memory on the slave node based on the synchronization metadata information, wherein the synchronization metadata information is used for indicating space occupancy and idleness of the persistent memory.

A computer program code for performing the operation in the present disclosure can be writted in one or more programming languages which include, but are not limited to object-oriented programming languages, such as Java, Smalltalk, and C++, and further include conventional procedural programming languages, such as "C" languages or similar programming languages. The program code can be completely executed on a user's computer, partially executed on the user's computer, executed as an independent software package, partially executed on the user's computer and partially executed on a remote computer, or completely executed on the remote computer or a server. When the remote computer is involved, the remote computer can be connected to the user's computer via any kind of network including a local area network (LAN) or a wide area network (WAN), or can be connected to an external computer (for example, connected by an Internet service provider by means of the Internet).

The flow diagrams and block diagrams in the accompanying drawings show possibly-implemented system architectures, functions and operations of the system, method and computer program product according to various embodiments of the present disclosure. In this regard, each block in the flow diagrams or the block diagrams may represent a part of a module, a program segment or a code, and a part of the module, the program segment or the code includes one or more executable instructions for implementing specified logic functions. It should be also noted that, in some implementations as alternations, functions marked in the blocks may also occur in an order different from an order marked in the accompanying drawings. For example, in fact, two continuous blocks can be performed approximately concurrently, and sometimes, they may also be performed in an opposite order, which depends upon the revolved functions. It should be further noted that each block in the block diagrams and/or the flow diagrams and combinations of the blocks in the block diagrams and/or the flow diagrams can be implemented by a special-purpose hardware-based system executing the specified functions or operations, or can be implemented by a combination of special-purpose hardware and a computer instruction.

The modules involved in the embodiments of the present disclosure can be implemented in a form of software or hardware. Names of the modules do not constitute limitations on the modules themselves under some conditions.

The functions described as above in the present disclosure can be at least partially executed by one or more hardware logic components. For example, non-restrictively, exemplary hardware logic components that can be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine-readable medium can be a tangible medium which may include or store a program used by an instruction execution system, apparatus or device or used in combination with the instruction execution system, apparatus or device. The machine-readable medium can be a machine-readable signal medium or a machine-readable storage medium. The machine-readable medium may include, but is not limited to an electronic, magnetic, optical, electromagnetic, infrared or semiconductor system, apparatus or device, or any appropriate combinations thereof. A more specific example of the machine-readable storage medium may include an electric connection based on one or more wires, a portable computer disk, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device or any appropriate combinations thereof.

According to one or more embodiments of the present disclosure, example 1 provides a data access method for a computing storage separation system including a master node and a slave node, wherein the method includes: a data access request is acquired; an index table on the master node of the computing storage separation system or synchronization metadata information of the master node and the slave node of the master node is acquired based on a type of the data access request; when the data access request is a data read request, an index item of a to-be-read data block in the index table is queried, and the to-be-read data block is read based on an index item query result, wherein the index item in the index table at least includes a storage location attribute and a storage address attribute; and/or when the data access request is a data write request, a to-be-written data block is written into an idle space of a persistent memory on the slave node based on the synchronization metadata information, wherein the synchronization metadata information is used for indicating space occupancy and idleness of the persistent memory.

According to one or more embodiments of the present disclosure, example 2 involves the method in example 1, wherein the step that the to-be-read data block is read based on an index item query result includes: when the storage location attribute of the queried index item indicates that the to-be-read data block is stored in a local cache table of the master node, the to-be-read data block is read from the cache table based on the storage location attribute of the queried index item; when the storage location attribute of the queried index item indicates that the to-be-read data block is stored in the persistent memory, the to-be-read data block is read from the persistent memory by means of remote direct memory access based on the storage location attribute of the queried index item; when the storage location attribute of the queried index item indicates that the to-be-read data block is stored in a solid state disk on the slave node, the to-be-read data block is read from the solid state disk by means of remote process call based on the storage location attribute of the queried index item; and when the index item of the to-be-read data block is not queried, the to-be-read data block is read from the slave node by means of remote process call.

According to one or more embodiments of the present disclosure, example 3 involves the method in example 2. After the to-be-read data block is read from the persistent memory by means of remote direct memory access based on the storage location attribute of the queried index item, the method further includes: validity of the read data block is checked; and when the read data block is invalid, the to-be-read data block is read from the solid state disk by means of remote process call.

According to one or more embodiments of the present disclosure, example 4 involves the method in example 2. The method further includes: after the to-be-read data block is successfully read, the index table and the cache table are updated.

According to one or more embodiments of the present disclosure, example 5 involves the method in example 1. The step that a to-be-written data block is written into an idle space of a persistent memory on the slave node includes: the to-be-written data block is packaged; and the packaged to-be-written data block is written into the idle space by means of remote direct memory access.

According to one or more embodiments of the present disclosure, example 6 involves the method in example 5. The step that the to-be-written data block is packaged includes: the to-be-written data block is packaged as a to-be-written data block in a log structure, wherein the to-be-written data block in the log structure includes the to-be-written data block, a block identifier and a data integrity identifier.

According to one or more embodiments of the present disclosure, example 7 involves the method in example 5. The method further includes: before writing is performed, it is determined, based on the synchronization metadata information, whether the idle space is sufficient to write in the to-be-written data block; when the idle space is insufficient, data in the persistent memory is synchronized into the solid state disk on the slave node; and after the synchronization is completed, the synchronization metadata information is updated.

According to one or more embodiments of the present disclosure, example 8 involves the method in example 7. The step that data in the persistent memory is synchronized into the solid state disk on the slave node includes: expired data in an occupied space of the persistent memory is marked to be invalid; a head pointer indicating a starting position of the occupied space of the persistent memory is controlled to move forwards, and meanwhile, cold data is synchronized back to the solid state disk; and hot data synchronized back to the solid state disk or source data copied to an adjacent area of a tail pointer indicating an end of the occupied space of the persistent memory is invalided.

According to one or more embodiments of the present disclosure, example 9 involves the method in one of examples 1 to 8. The synchronization metadata information includes a head pointer pointing to a starting position of the occupied space of the persistent memory and a tail pointer pointing to an end of the occupied space of the persistent memory, wherein the head pointer is behind the tail pointer in the synchronization metadata information on each of the master node and the slave node; a value of the tail pointer on the master node is always ahead of or equal to a value of the tail pointer on the slave node; and a value of the head pointer on the slave node is always ahead of or equal to a value of the head pointer on the master node.

Preferred embodiments of the present disclosure and explanation for applied technical principles are only described as above. It should be understood by the skilled in the art that the disclosure scope involved in the present disclosure is not limited to a technical solution formed by a specific combination of the above-mentioned technical features, and shall also include other technical solutions formed by any combinations of the above-mentioned technical features or their equivalent features without departing from the above-mentioned disclosure concept, such as a technical solution formed by mutual replacement between the above-mentioned features and technical features with similar functions disclosed (but is not limited to) in the present disclosure.

In addition, although the operations are described in a specific order, which should not be understood as a requirement that these operations are performed in the shown specific order or a sequential order. In a certain environment, multi-tasking and concurrent processing can be advantageous. Similarly, although the above discussion contains a number of specific implementation details, these details should not be interpreted as limitations on the scope of the present disclosure. Some features described in the context of an individual embodiment may also be implemented in the individual embodiment by combination. Conversely, various features described in the context of a single embodiment may also be implemented in a plurality of embodiments individually or in any appropriate sub-combinations.

The subject matter has been described in language specific to structural features and/or logical actions of the method, however, it should be understood that the topic defined in the appended claims is not necessarily limited to the specific features or actions described as above. Conversely, the specific features and actions described as above are only exemplary forms for implementing the claims. For the apparatus in the above-mentioned embodiment, specific ways that the modules perform operations have been described in detail in the embodiment of the method so as not to be repeated in detail herein.

What is claimed is:

1. A data access method for a computing storage separation system, comprising:
   acquiring a data access request;
   acquiring, based on a type of the data access request, an index table on a master node of the computing storage separation system or synchronization metadata information of the master node and a slave node of the master node;
   when the data access request is a data read request, querying an index item of a to-be-read data block in the index table, and reading the to-be-read data block based on a result of querying the index item, wherein the index item in the index table at least comprises a storage location attribute and a storage address attribute; and/or when the data access request is a data write request, writing a to-be-written data block into an idle space of a persistent memory on the slave node based on the synchronization metadata information, wherein the synchronization metadata information is used for indicating space occupancy and idleness of the persistent memory, wherein said reading the to-be-read data block based on the result of querying the index item comprises:

when the storage location attribute of the queried index item indicates that the to-be-read data block is stored in a local cache table of the master node, reading the to-be-read data block from the cache table based on the storage location attribute of the queried index item;

when the storage location attribute of the queried index item indicates that the to-be-read data block is stored in the persistent memory, reading the to-be-read data block from the persistent memory by means of remote direct memory access based on the storage location attribute of the queried index item;

when the storage location attribute of the queried index item indicates that the to-be-read data block is stored in a solid state disk on the slave node, reading the to-be-read data block from the solid state disk by means of remote process call based on the storage location attribute of the queried index item; and when the index item of the to-be-read data block is not queried, reading the to-be-read data block from the slave node by means of remote process call.

2. The method of claim 1, further comprising, subsequent to said reading the to-be-read data block from the persistent memory by means of remote direct memory access based on the storage location attribute of the queried index item:

checking validity of the read data block; and when the read data block is invalid, reading the to-be-read data block from the solid state disk by means of remote process call.

3. The method of claim 1, further comprising:

after the to-be-read data block is successfully read, updating the index table and the cache table.

4. The method of claim 1, wherein said writing the to-be-written data block into the idle space of the persistent memory on the slave node comprises:

packaging the to-be-written data block; and writing the packaged to-be-written data block into the idle space by means of remote direct memory access.

5. The method of claim 2, wherein said packaging the to-be-written data block comprises:

packaging the to-be-written data block as a to-be-written data block in a log structure, wherein the to-be-written data block in the log structure comprises the to-be-written data block, a block identifier and a data integrity identifier.

6. The method of claim 4, further comprising:

before writing is performed, determining, based on the synchronization metadata information, whether the idle space is sufficient to write the to-be-written data block;

when the idle space is insufficient, synchronizing data in the persistent memory into a solid state disk on the slave node; and after the synchronization is completed, updating the synchronization metadata information.

7. The method of claim 6, wherein said synchronizing data in the persistent memory into the solid state disk on the slave node comprises:

marking expired data in an occupied space of the persistent memory to be invalid;

controlling a head pointer indicating a starting position of the occupied space of the persistent memory to move forwards, and meanwhile synchronizing cold data back to the solid state disk; and invaliding hot data synchronized back to the solid state disk or source data copied to an adjacent area of a tail pointer indicating an end of the occupied space of the persistent memory.

8. The method of claim 1, wherein the synchronization metadata information comprises a head pointer pointing to a starting position of an occupied space of the persistent memory and a tail pointer pointing to an end of the occupied space of the persistent memory, wherein the head pointer is behind the tail pointer in the synchronization metadata information on each of the master node and the slave node;

a value of the tail pointer on the master node is always ahead of or equal to a value of the tail pointer on the slave node; and a value of the head pointer on the slave node is always ahead of or equal to a value of the head pointer on the master node.

9. A non-transitory computer-readable medium, having a computer program stored thereon, wherein the program, when executed by a processor, implements the steps of the method of claim 1.

10. An electronic device, comprising:

a memory, having a computer program stored thereon; and a processor configured to execute the computer program in the memory so as to implement a data access method for a computing storage separation system, comprising:

acquiring a data access request;

acquiring, based on a type of the data access request, an index table on a master node of the computing storage separation system or synchronization metadata information of the master node and a slave node of the master node;

when the data access request is a data read request, querying an index item of a to-be-read data block in the index table, and reading the to-be-read data block based on a result of querying the index item, wherein the index item in the index table at least comprises a storage location attribute and a storage address attribute; and/or when the data access request is a data write request, writing a to-be-written data block into an idle space of a persistent memory on the slave node based on the synchronization metadata information, wherein the synchronization metadata information is used for indicating space occupancy and idleness of the persistent memory, wherein said reading the to-be-read data block based on the result of querying the index item comprises:

when the storage location attribute of the queried index item indicates that the to-be-read data block is stored in a local cache table of the master node, reading the to-be-read data block from the cache table based on the storage location attribute of the queried index item;

when the storage location attribute of the queried index item indicates that the to-be-read data block is stored in the persistent memory, reading the to-be-read data block from the persistent memory by means of remote direct memory access based on the storage location attribute of the queried index item;

when the storage location attribute of the queried index item indicates that the to-be-read data block is stored in a solid state disk on the slave node, reading the to-be-read data block from the solid state disk by means of remote process call based on the storage location attribute of the queried index item; and when the index item of the to-be-read data block is not queried, reading the to-be-read data block from the slave node by means of remote process call.

11. The electronic device of claim 10, wherein the method further comprises, subsequent to said reading the to-be-read data block from the persistent memory by means of remote direct memory access based on the storage location attribute of the queried index item:

checking validity of the read data block; and when the read data block is invalid, reading the to-be-read data block from the solid state disk by means of remote process call.

12. The electronic device of claim 10, wherein the method further comprises:

after the to-be-read data block is successfully read, updating the index table and the cache table.

13. The electronic device of claim 10, wherein said writing the to-be-written data block into the idle space of the persistent memory on the slave node comprises:

packaging the to-be-written data block; and writing the packaged to-be-written data block into the idle space by means of remote direct memory access.

14. The electronic device of claim 13, wherein said packaging the to-be-written data block comprises:

packaging the to-be-written data block as a to-be-written data block in a log structure, wherein the to-be-written data block in the log structure comprises the to-be-written data block, a block identifier and a data integrity identifier.

15. The electronic device of claim 13, wherein the method further comprises:

before writing is performed, determining, based on the synchronization metadata information, whether the idle space is sufficient to write the to-be-written data block;

when the idle space is insufficient, synchronizing data in the persistent memory into a solid state disk on the slave node; and after the synchronization is completed, updating the synchronization metadata information.

16. The electronic device of claim 15, wherein said synchronizing data in the persistent memory into the solid state disk on the slave node comprises:

marking expired data in an occupied space of the persistent memory to be invalid;

controlling a head pointer indicating a starting position of the occupied space of the persistent memory to move forwards, and meanwhile synchronizing cold data back to the solid state disk; and invaliding hot data synchronized back to the solid state disk or source data copied to an adjacent area of a tail pointer indicating an end of the occupied space of the persistent memory.

17. The electronic device of claim 10, wherein the synchronization metadata information comprises a head pointer pointing to a starting position of an occupied space of the persistent memory and a tail pointer pointing to an end of the occupied space of the persistent memory, wherein the head pointer is behind the tail pointer in the synchronization metadata information on each of the master node and the slave node;

a value of the tail pointer on the master node is always ahead of or equal to a value of the tail pointer on the slave node; and a value of the head pointer on the slave node is always ahead of or equal to a value of the head pointer on the master node.

* * * * *